United States Patent [19]

Boyd et al.

[11] 4,225,216

[45] Sep. 30, 1980

[54] TUNGSTEN NIOBATE ELECTROCHROMIC DEVICE

[75] Inventors: Gary D. Boyd, Rumson; Ross A. Lemons, Tinton Falls; James C. Phillips, Summit; Joseph P. Remeika, Warren Township, Somerset County; Edward G. Spencer, Berkeley Heights, all of N.J.

[73] Assignee: Bell Telephone Laboratories, Incorporated, Murray Hill, N.J.

[21] Appl. No.: 13,385

[22] Filed: Feb. 21, 1979

[51] Int. Cl.³ .......................... G02F 1/17; G02F 1/23
[52] U.S. Cl. .................. 350/357; 252/300; 252/408; 252/514; 252/518
[58] Field of Search ............. 350/357; 252/408, 300, 252/518, 514

[56] References Cited

U.S. PATENT DOCUMENTS

| | | | |
|---|---|---|---|
| 3,521,941 | 7/1970 | Deb et al. | 350/357 |
| 3,827,784 | 8/1974 | Giglia et al. | 350/357 |
| 3,971,624 | 7/1976 | Bruesch et al. | 350/357 |
| 4,013,343 | 3/1977 | Jaccard et al. | 350/357 |
| 4,059,341 | 11/1977 | Zeller | 350/357 |
| 4,060,311 | 11/1977 | Green | 350/357 |
| 4,088,392 | 5/1978 | Meyers | 350/357 |
| 4,106,862 | 8/1978 | Bayard | 350/357 |
| 4,110,259 | 8/1978 | Sichel | 350/357 |
| 4,182,551 | 1/1980 | Washida et al. | 350/357 |

OTHER PUBLICATIONS

Chang, I. F., IBM Tech. Discl. Bulletin, vol. 19, No. 1, pp. 326-327, (1976).

Krause, D. et al., Electro-Optical Systems Design, pp. 54-55, (Nov. 1977).
Deb, S. K., *Philosophic Mag., vol. 27, pp. 801-822, (1970)*.
Crandall, R. S. et al., Appl. Phys. Lett., vol. 26, pp. 120-121, (1975).
Faughnan, B. W. et al., RCA Review, vol. 36, pp. 177-197, (1975).
Faughnan, B. W. et al., Appl. Phys. Lett., vol. 27, pp. 275-277, (1975).
Crandall, R. S. et al., Appl. Phys. Lett., vol. 28, pp. 95-97, (1976).
Sichel, E. K. et al., Appl. Phys. Lett., vol. 31, pp. 109-111, (1977).
Gerard, P. et al., J. Appl. Phys., vol. 48, pp. 4252-4255, (1977).
Obayashi, H. et al., J. Solid State Chem., vol. 17, pp. 79-89, (1976).
Roth, R. S. et al., J. Res. NBS, vol. 70A, No. 4, pp. 281-301, (1966).
Iijima, S. et al., Acta Cryst., vol. A 30, pp. 22-36, (1974).

*Primary Examiner*—Teddy S. Gron
*Attorney, Agent, or Firm*—Peter V. D. Wilde

[57] ABSTRACT

Disclosed is an electro-optical device in which color changes are electrically induced in an electrochromic material which is a single or polycrystalline niobium tungstate represented approximately by the formula $W_9Nb_8O_{47}$. The device comprises an ion source and a source of an electrical field which may be reversible so as to produce coloring and bleaching of the electrochromic material. Due to high corrosion resistance of such material, the ion source may conveniently be a hydrous electrolyte.

8 Claims, 1 Drawing Figure

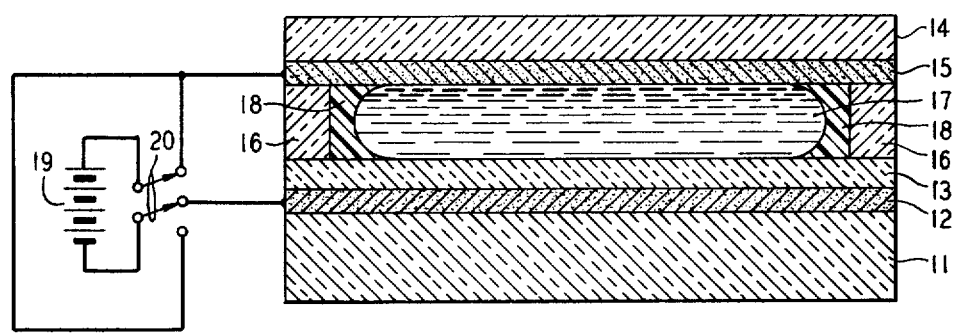

TUNGSTEN NIOBATE ELECTROCHROMIC DEVICE

TECHNICAL FIELD

The invention is concerned with electro-optical devices.

BACKGROUND OF THE INVENTION

Electrochromic materials, i.e., materials susceptible to electrically induced change in coloration, have been considered for use in a variety of devices such as, e.g., optical filters and flat screen displays. These devices comprise an electrochromic material, typically in the form of a layer, a source of ions in contact with a surface of such layer, and a source of a variable electric field such as, e.g., a pair of transparent electrodes. Specific examples of electrochromic materials are $WO_3$, $MoO_3$, and $V_2O_5$; additional materials are disclosed in U.S. Pat. No. 3,521,941 (issued July 28, 1970). Various device structures are disclosed, e.g., in the above-cited patent and in U.S. Pat. No. 4,060,311 (issued Nov. 29, 1977). Application of electrochromic materials in optical communications is disclosed in pending U.S. Pat. application Ser. No. 973,162, filed Dec. 26, 1978, for L. F. Johnson-S. Singh-L. G. Van Uitert.

While color changes in electrochromic materials are generally believed to result from a valance change (charge compensation being provided by the movement of ions), the exact physical mechanism underlying the generation and annihilation of color absorption centers in electrochromic materials remains a subject of continuing investigations. For example, D. Krause et al., "Electrochromic Coatings for Reflectivity Control", *Electro-Optical Systems Design*, November 1977, page 54, describe a reaction involving simultaneous injection of equal numbers of protons and electrons into colorless $WO_3$ and yielding a blue reaction product.

Electrical and optical properties of electrochromic $WO_3$ have been extensively investigated and reported on in a series of papers comprising the following: S. K. Deb, "Optical and Photoelectric Properties and Colour Centers in Thin Films of Tungsten Oxide", *Philosophic Magazine*, Volume 27, page 801 (1973), Richard S. Crandall et al., "Measurement of the Diffusion Coefficient of Electrons in $WO_3$ Films", *Applied Physics Letters*, Volume 26, No. 3, Feb. 1, 1975, page 120, Brian W. Faughnan et al., "Electrochromism in $WO_3$ Amorphous Films", *RCA Review*, Volume 36, March 1975, page 177, Brian W. Faughnan et al., "Model for the Bleaching of $WO_3$ Electrochromic Films by an Electric Field", *Applied Physics Letters*, Volume 27, No. 5, Sept. 1, 1975, page 275, Richard S. Crandall et al., "Dynamics of Coloration of Amorphous Electrochromic Films of $WO_3$ at Low Voltages", *Applied Physics Letters*, Volume 28, No. 2, Jan. 15, 1976, page 95, E. K. Sichel et al., "Electrochromism in the Composite Material Au-$WO_3$", *Applied Physics Letters*, Volume 31, No. 2, July 15, 1977, page 109, and P. Gerard et al., "Color in Tungsten Trioxide Thin Films", *Journal of Applied Physics*, Volume 48, No. 10, October 1977, page 4252.

Another practical concern is with operational reliability and service life of electrochromic devices. For example, use of an anhydrous source of ions as disclosed in U.S. Pat. No. 4,059,341 (issued Nov. 22, 1977) is motivated by a desire to prolong the useful life of devices. While such concern may arise primarily when elevated operating voltages are employed, shortening of service life due to corrosion of the electrochromic material in the presence of a hydrous electrolyte is a concern even at lower operating voltages. Consequently, it is desirable to have available electrochromic materials which exhibit high corrosion resistance.

Additional references which are considered relevant in connection with the invention are as follows: H. Obayashi et al., "Intermediate Phases and Pseudophases in the System $WO_3$—$Nb_2O_5$: Tetragonal Tungsten Bronze Phases", *Journal of Solid State Chemistry*, Volume 17, pages 79–89 (1976), R. S. Roth et al., "Phase Equilibrium as Related to Crystal Structure in the System Niobium Pentoxide-Tungsten Trioxide", *Journal of Research of the National Bureau of Standards*, Volume 70A, Nov. 4, July–August 1966, Page 281, S. Iijima et al., "Structural Studies by High-resolution Electron Microscopy: Tetragonal Tungsten Bronze-Type Structures in the System $Nb_2O_5$—$WO_3$", *Acta Crystallographica*, Volume A30, (1974), page 22, and S. Iijima et al., "Structural Studies by Electron Microscopy: Coherent Intergrowth of the $ReO_3$ and Tetragonal Tungsten Bronze Structure Types in the System $Nb_2O_5$—$WO_3$", *Acta Crystallographica*, Volume A30 (1974), page 29.

SUMMARY OF THE INVENTION

The invention is an electro-optical device comprising an electrochromic material which consists essentially of a tungsten niobate approximately represented by the formula $W_9Nb_8O_{47}$. Coloring of such material ranges from a pale yellow to dark blue and persists in the absence of an electric field. On account of high corrosion resistance, the device may conveniently be operated with hydrous electrolytes such as, e.g., dilute sulfuric acid.

BRIEF DESCRIPTION OF THE DRAWING

The FIGURE shows, in cross section, an electrochromic device which is reversibly connected to a source of a direct-current voltage.

DETAILED DESCRIPTION

The FIGURE shows first substrate 11, first contact layer 12, electrochromic layer 13, second substrate 14, second contact layer 15, spacer 16, liquid electrolyte 17 which is sealed between layers 13 and 15 by means of adhesive sealant 18, and source of direct current voltage 19 which is electrically connected to layers 12 and 15 via switch 20. According to the invention, layer 13 consists essentially of a single crystal or polycrystalline tungsten niobate which is approximately represented by the formula $W_9Nb_8O_{47}$.

Device Manufacture. Devices of the invention may be manufactured, e.g., by layer deposition on substrates, fused silica and sapphire being among exemplary substrate materials. Both substrates may be transparent as, e.g., in projection devices; alternatively, one substrate may be opaque as, e.g., in devices utilizing reflected light. Substrates may serve to support contact and electrochromic layers and to contain a preferably liquid electrolyte, ion source having the consistency of a solid, paste, or gel being alternatives to a liquid electrolyte. Prior to deposition of contact layers 12 and 15, substrates 11 and 14 are preferably polished and cleaned to enhance adhesion of contact layers. Among suitable transparent contact materials are doped semiconducting tin oxide and indium tin oxide which may conveniently be deposited by sputtering. Contact layers may also be made by depositing thin layers of Ag, Au, or Pt by thermal or electron evaporation, choice of preferred contact layer material being generally based on degree of transparency or reflectivity, respectively, depending on whether a device is intended for operation in a transmission mode or a reflecting mode.

Contact layers may be composite as manufactured, e.g., by electron beam evaporation of Pt on a Cr flash. Finally, glass substrates coated with a suitable contact layer may be commercially available.

Deposition of electrochromic layer 13 may be, e.g., by sputtering or ion beam deposition. A single sputtering target may, e.g., consist essentially of single crystal or polycrystalline $W_9Nb_8O_{47}$ or may consist essentially of a mixture of $WO_3$ and $Nb_2O_5$ in a molecular proportion of approximately 9:4. Deposition may also be by sputtering in oxygen from a target of W and Nb metallic powders (mixed in proper proportion) or from interlaced W and Nb ribbons (having properly proportioned surface areas). Oxygen pressure may typically be on the order of 1 to 10 micrometer mercury during such sputtering. Final layer thickness may be approximately 0.5 micrometer.

To produce a polycrystalline structure, sputtering is preferably carried out while the substrate is held at elevated temperature and, in particular, at a temperature in the range of 600–800 degrees C. Alternatively, a layer may be deposited at lower temperatures by sputtering or ion beam deposition, crystallinity being developed subsequent to deposition by heating to a temperature in such preferred range. Deposition of layers 12, 13, and 15 may be followed by selective removal of layers, e.g., by standard masking and etching techniques, so as to result in patterned layers as may be desired for specific displays.

Electrode spacing is not critical and may conveniently be on the order of 0.1 to 1 millimeter.

It is generally believed that electrochromism in $W_9Nb_8O_{47}$ is based on a reversible valance change between $W^{+6}$ and $W^{+5}$ (blue), a proton being injected to provide charge compensation, and proton mobility being enhanced by a so-called tunnel structure in a crystalline state. Such structure is described in the papers by Obayshi, Roth, and Iijima cited above. Accordingly, polycrystalline or single crystal structure in layer 13 is preferred.

In the interest of adequate electrochromic response, composition should preferably be accurate to within 2 percent in the sense that proportional amounts of constituents $Nb_2O_5$ and $WO_3$ deviate preferably by at most 2 molecular percent from amounts present in a nominal composition represented by the formula $W_9Nb_8O_{47} = (9WO_3)(4Nb_2O_5)$. Consequently, preferred compounds may be represented by formulas $(9WO_3)_{1+x}(4Nb_2O_5)_{1-x}$ where x is a number in the preferred range of $-0.02$ to $+0.02$.

While reactive impurities are considered detrimental to electrochromic response and, accordingly, are preferably kept below 1 weight percent, certain nonreactive additives may be tolerable and even beneficial for certain applications. For example, elemental gold may be present in colloidal dispersion, resulting in a material analogous to the cermet disclosed in the paper by Sichel et al. cited above. Such additions may result in a shifted absorption edge and concomitant change of color range.

Application of a positive voltage to electrode 15 causes coloration of layer 13, coloration remains essentially unchanged when electrodes are open-circuited, and reversal of voltage causes bleaching. Color may vary from pale yellow in the bleached state to a deep blue in the colored state. Speed of color change depends directly on the magnitude of field strength; e.g., for a change between color extremes in an experimental device, approximately 4 seconds were required when voltage was 1 volt, but only about 2 seconds were required when voltage was 2 volts across a 0.5 micrometer thick layer of $W_9Nb_8O_{47}$.

Corrosion Resistance. Deposited films of electrochromic $W_9Nb_8O_{47}$ were found to have superior corrosion resistance. For example, no noticeable change in layer thickness was observed after holding selected films for one month in $H_2O$, in 1-molar $H_2SO_4$, and in 5-molar NaOH.

EXAMPLE 1

Fused silica substrates 11 and 14 were coated with layers 12 and 15 of indium tin oxide by sputtering. For deposition of layer 13 by sputtering, a target was prepared from reagent grade (0.9999 pure) powders of $Nb_2O_5$ and $WO_3$ by ball milling 4 parts $Nb_2O_5$ and 9 parts $WO_3$ in alcohol using alumina balls, drying the mixture, pressing it by means of a 2-inch diameter steel die, and heating at 1250 degrees C. in air for 15 hours. A layer of $W_9Nb_8O_{47}$ having a thickness of approximately 0.5 micrometers was deposited by sputtering from the target at a rate of approximately 100–200 Angstroms/min. Sputtering was carried out while the substrate was held at a temperature of approximately 650–700 degrees C. Radio frequency power was approximately 500 watts, and the atmosphere was 20 percent oxygen and 80 percent argon at a pressure of 20 torr. Polycrystalline structure of the resulting layer was verified by X-ray analysis according to Debye-Scherrer which revealed sharp lines. Operating characteristics were as described above.

EXAMPLE 2

Using a crystalline $W_9Nb_8O_{47}$ target, thin films were deposited onto indium tin oxide coated sapphire substrates held near room temperature. Films were subsequently heated in air at 700 degrees C. for approximately 30 minutes to develop a polycrystalline structure. Operating characteristics were as described above.

We claim:

1. An electro-optical device comprising an electrochromic material, an electrolyte ion source in contact with at least a portion of a surface of said material, and means for producing an electric field across said portion to induce color change in said electrochromic material CHARACTERIZED IN THAT said material consists essentially of a single or polycrystalline tungsten niobate represented by the formula $(9WO_3)_{1+X}(4Nb_2O_5)_{1-X}$ where X is a number in the range of $-0.02$ to $+0.02$.

2. The device of claim 1 in which said material forms a substrate-supported layer.

3. The device of claim 1 in which said ion source is a hydrous electrolyte.

4. The device of claim 2 in which said material has been deposited on a substrate by sputtering while said substrate was at a temperature in the range of 600–800 degrees C.

5. The device of claim 2 in which said material has been deposited on a substrate by sputtering or ion beam deposition followed by heating at a temperature in the range of 600–800 degrees C.

6. The device of claim 1 in which reactive impurities are present in said material in a combined amount of less than 1 weight percent.

7. The device of claim 1 in which said material is interspersed with at least one nonreactive additive.

8. The device of claim 7 in which said additive is elemental gold in an amount not exceeding 25 atomic percent.

* * * * *